United States Patent [19]

Kelleher

[11] 4,450,394

[45] May 22, 1984

[54] STEPPER MOTOR DRIVE CIRCUIT

[75] Inventor: Kevin C. Kelleher, Plainfield, Ind.

[73] Assignee: RCA Corporation, New York, N.Y.

[21] Appl. No.: 355,101

[22] Filed: Mar. 5, 1982

[51] Int. Cl.³ .............................................. H02K 29/04
[52] U.S. Cl. ...................................... 318/696; 318/685
[58] Field of Search ........................ 318/138, 636, 685

[56] References Cited

U.S. PATENT DOCUMENTS

| | | | |
|---|---|---|---|
| 3,699,413 | 10/1972 | Silva et al. | 318/138 |
| 3,903,467 | 9/1975 | Eckardt | 318/696 |
| 4,025,859 | 5/1977 | Smith | 318/696 |
| 4,253,052 | 2/1981 | Meier | 318/696 |
| 4,306,181 | 12/1981 | Welburn | 318/696 |

OTHER PUBLICATIONS

"Electronic Devices & Circuit Theory", The Southeast Book Company, 3rd Edition, p. 205.
"Network Analysis & Synthesis", F. F. Kuo, John Wiley & Sons, Inc., 2nd Edition, pp. 106-107 & 128-129.
"Basic Circuit Theory", C. A. Desoer et al., McGraw-Hill Book Company, pp. 166-167.

Primary Examiner—G. Z. Rubinson
Assistant Examiner—Saul M. Bergmann
Attorney, Agent, or Firm—E. M. Whitacre; J. S. Tripoli; E. P. Herrmann

[57] ABSTRACT

A simplified drive circuit for applying bipolar drive current to a stepper motor includes a switch for alternately connecting a first end of the stator winding between supply potential and ground. The second end of the winding is coupled to supply potential by a resistor and coupled to ground by the parallel combination of a second resistor and a capacitor. The capacitor alternately operates as a short circuit when supply potential is applied to the first end of the winding and as a battery when the first end of the winding is grounded.

3 Claims, 5 Drawing Figures

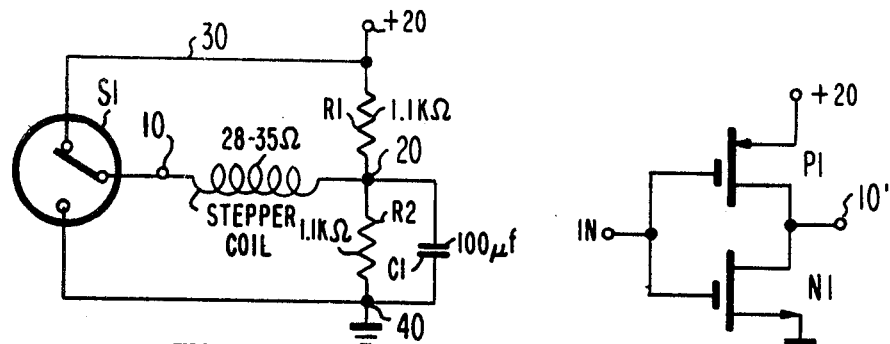
Fig.1
Fig.2
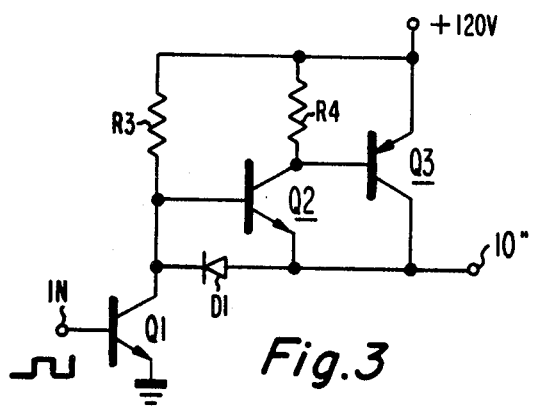
Fig.3
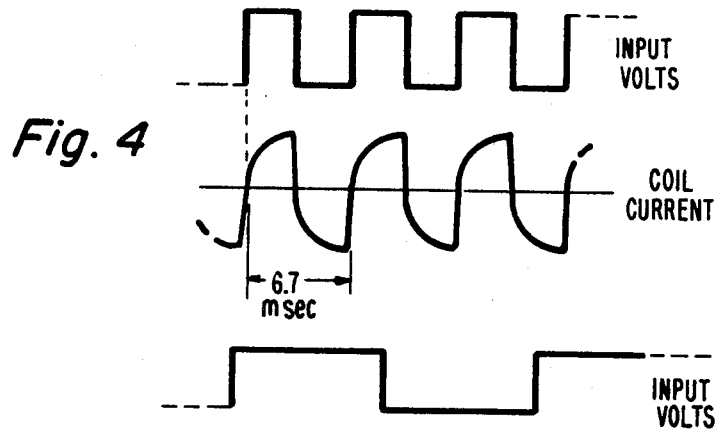
Fig.4
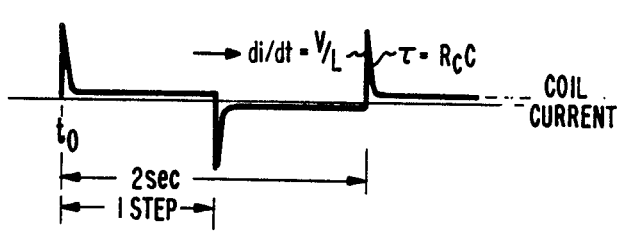
Fig.5

STEPPER MOTOR DRIVE CIRCUIT

BACKGROUND OF THE INVENTION

This invention relates to circuitry for driving the stator coil of a stepper motor and more particularly for providing two amplitudes of bipolar drive current to the coil depending on the instantaneous torque requirements of the motor.

Typically, stator coils of bipolar stepper motors are driven by bridge amplifiers which effectively commutate the polarity of a supply potential across the coil. These circuits require at least four driver transistors to perform the requisite switching. In addition in order to change the coil current amplitude, for example, when the motor is in a hold mode as opposed to a drive mode, some means must be provided to alter the drive potential, alter the driving impedance, or to chop the drive signal to provide selectable "average" drive parameters, etc. Circuitry to permit such coil current adjustment usually complicates the system, adds to system cost, adds to system bulk and adds to the energy dissipated by the driver circuitry.

Certain stepper motor applications require that the motor operate in the high torque mode for relatively short intervals with the major portion of its operation being that of stepping at a slow rate so that coil current demands are primarily holding currents. For example, in a video disc player a stepper motor may be used to drive a carriage which carries the recorded signal recovery transducer. At the beginning of play it is desired that the carriage move rapidly to seek the beginning of the recorded track on the record. The motor step rate may be at 300 steps per second, i.e., the motor must operate at high torque. However, during normal playback the carriage is required to move slowly in consonance with the transducer following the record track. In this mode the motor may step at 1-2 steps per second and will be operating in a low torque mode.

Generally both the motor and the motor driving circuitry may be overdriven for short intervals without damage to either. Thus, for example, a 6 volt motor may be energized with 20 volts for periods of time too short to cause heating. The present inventor took advantage of this feature to design a bipolar stepper motor drive circuit which provides high torque for particular step rates, a low value of holding current and is less complicated and less costly than conventional bridge drive circuitry with similar drive features.

SUMMARY OF THE INVENTION

The present invention, for driving a stepper motor stator coil, includes a pair of switches connected to one terminal of the coil for alternately applying relatively positive or relatively negative supply potential. The second terminal of the coil is serially connected to first and second resistors having their respective other ends connected to relatively positive and relatively negative supply potentials respectively. The second end of the coil is also serially connected to a capacitor, the other end of which is tied to one of the supply potentials.

The switches are selectively closed (stepped) to determine the direction of current flow in the coil. At high step rates the capacitor sinks current through the coil from the supply terminal to ground and on alternate switch phases sources (as a battery) reverse current through the coil to ground, the coil current being limited only by the driving impedance of the switches and the inherent coil resistance. Since the stepper motor is being overdriven it can generate relatively high average torque. At low step rates when a given switch is closed the capacitor initially acts as a short circuit passing a relatively high current pulse through the coil. The coil current ultimately charges the capacitor, this reduces the potential across the coil and thereby the current conducted in the coil. Once the capacitor is charged, all further coil current is provided through one of the two resistors and the coil current is limited to the desired holding current.

BRIEF DESCRIPTION OF THE DRAWINGS

FIG. 1 is a schematic diagram of a stepper motor coil drive circuit embodying the present invention;

FIGS. 2 and 3 are schematic diagrams of electronic circuits which may be used to realize the switch S1 in FIG. 1; and FIGS. 4 and 5 are timing diagrams of coil current for the FIG. 1 circuit operating at high and low step rates respectively.

DETAILED DESCRIPTION OF THE INVENTION

The circuit illustrated in FIG. 1 is a driving arrangement for one phase of a bipolar stepper motor. Typically this type of stepper motor will have two phases and therefore two such circuits would be required to energize the motor. The two phases would generally be energized with a 90 degree phase relation.

In FIG. 1 a first end 20 of the stepper motor coil is connected to a relatively positive supply potential bus 30 by a 1.1 KOhm resistor R1 and connected to a relatively negative supply bus 40 by a 1.1 KOhm resistor R2. A 100 microfarad capacitor C1 is coupled between the first end 20 of the coil and the supply bus 40. The second end 10 of the coil is connected to the pole of the single pole-double throw switch S1, the contacts of which are connected to the positive (30) and negative (40) supply buses.

Operation of the FIG. 1 circuit proceeds as follows. Assume the stepper coil has an internal resistance of 30 Ohms and an inductance of 40 milliHenries. Further assume that the value of holding current for the particular motor application is low, e.g., approximately 20 milliAmperes and that at the start of the cycle terminal 10 is connected to ground (40) and capacitor C1 is discharged. At time To (FIG. 5) switch S1 connects terminal 10 to the 20 volt supply. Capacitor C1, being large, essentially represents a short circuit to ground with respect to the step function input voltage across the serial connection of coil and capacitor. The initial rate of increase in current di/dt is governed by the inductance L of the coil and is approximated by $di/dt \approx V/L$. The maximum possible current approaches $V/R_c$ where V is the applied voltage and $R_c$ is the coil resistance. Shortly after reaching peak value the coil current begins to decay with a time constant $\tau = R_c C1$ as capacitor C1 charges toward the potential $VR2/(R2+R_c)$ which is the equilibrium potential at terminal 20, established by the resistor-divider of $R_c$ and R2 across V volts. (Note the resistor R1 is ignored in determining the equilibrium potential because it is much larger than $R_c$). Once the equilibrium potential is reached at terminal 20, coil current is determined substantially by resistor R2. This value of current is the holding current and R2 is selected to provide sufficient current in the stator windings to hold the rotor fixed in the particular application. In the circuit shown the holding current is approximately 18 ma.

FIG. 5 illustrates the instantaneous coil current as a function of applied coil voltage. Peaks of positive current occur coincidentally with rising edge transitions of applied potential at terminal 10, and peaks of negative current occur coincidentally with falling edge transitions of applied potential. The rate of change of the leading transitions of the current pulses are indicated by $di/dt=V/L$. The trailing current transitions of the current pulses are shown with a decay time constant of $\tau=R_cC$. Since power is proportional to current, and since peak current is conducted for a proportionately short portion of a stepping cycle, the circuit will dissipate relatively small average power per step (i.e., 20 V×18 ma or 360 milliwatts vs. approximately 13 watts for continuous peak current).

For the negative step, switch S1 connects terminal 10 to ground and capacitor C1, which has been charged substantially to the positive rail potential V, initially functions as a battery to supply current in the opposite direction through the coil. The initial negative current pulse reaches an amplitude approximately equal in amplitude to the aforedescribed positive pulse and then decays with a time constant $\tau=R_c C1$ until the potential on the capacitor reaches the equilibrium value of $VR_c/(R1+R_c)$. At this potential, holding current is sustained in the coil via resistor R1 at a value of approximately 18 ma in the illustrated circuit. From the foregoing analysis and the waveform in FIG. 5, it can be seen that the circuit produces a substantially symmetrical bipolar current drive to the stator coil.

In the high torque or rapid step mode the holding current is required to be significantly larger than the slow step mode so that the inertia of the driven element does not rotate the rotor poles past the stator coils and into a state where rotor position is not precisely controlled by the stepping pulses. The high holding current is achieved by designing the circuit such that the coil is driven with overvoltage and the coil current is still increasing at the end of the step period. Despite the fact that the coil current has not reached its maximum value at the end of a step period, i.e., the maximum amplitude which may be attained in the low step rate mode, it will have attained a value greater than the current value recommended to drive the coil. The effect of switching before the current reaches its maximum is that the holding current is in fact greater than the driving current, tending to insure more precise control of rotor position. It must be remembered, however, when overvoltages are utilized to produce the requisite average holding current, operation at the fast rate cannot be sustained for significant periods of time or the motor will overheat. The coil current versus time waveform illustrated in FIG. 4 exemplifies this mode of operation.

It should be appreciated that for situations where the motor is being overdriven circuit parameters may also be chosen which condition the coil circuit to achieve its maximum current value during a step period and in fact allow sufficient time for the current to begin to decay. Even a relatively large decay during the step period, for example 30%, may be tolerated provided the "average" current over the step period is sufficient to guarantee rotor control, i.e., rotor position or rotor-stator synchronism at the particular step rate. Note that there may be step rates between the 300 step per second rate and the slow rate where the average holding current will be insufficient to control the inertia of the driven element.

FIG. 2 is an electronic switch which may be substituted for the switch S1 in FIG. 1. The FIG. 2 circuit is an inverter comprising the series connection of complementary field effect transistors. In the circuit a p-type enhancement mode transistor P1 is connected between the positive supply potential and output terminal 10' to which the second coil terminal is connected. An n-type enhancement mode transistor is connected between the relatively negative supply potential and the output terminal 10'. The control electrodes of both transistors P1 and N1 are also connected to the input terminal at which step control pulses are applied. When a relatively positive control potential is applied to the input terminal, transistor N1 conducts in the common source mode connecting terminal 10 to the relatively negative supply terminal via a relatively small drain-source impedance. Alternatively when a relatively low control potential is applied to the input terminal, transistor P1 conducts in the common source mode connecting terminal 10' to the relatively positive supply potential via a relatively small drain-source impedance. When the input control pulses swing between the relatively positive and relatively negative supply potentials the two transistors conduct in the alternative, the off or non-conducting transistor presenting a high ($10^5$ ohm or greater) impedance to the output terminal. Thus the FIG. 2 circuit operates as an electronic single pole-double throw switch.

The circuit of FIG. 3 is another electronic substitute for switch S1. In FIG. 3, a positive potential applied to the base electrode of transistor Q1 conditions transistor Q1 to conduct sinking current from output terminal 10" through the diode D1. The current conducted in diode D1 develops a potential thereacross which is impressed against the base-emitter electrodes of npn transistor Q2, reverse biasing the base-emitter junction of transistor Q2 to hold it in a non-conducting state. The collector potential of transistor Q2 is held at the positive supply potential by resistor R4 biasing the pnp transistor Q3 off also.

A relatively negative potential applied to the base of transistor Q1 places it in the non-conducting state. The collector potential of transistor Q1 is raised to supply potential by the collector resistor R3 connected to the positive supply. The high potential at the collector of transistor Q1 biases transistor Q2 into conduction to provide emitter current to terminal 10. When transistor Q2 conducts it draws base current from pnp transistor Q3 biasing transistor Q3 into conduction in a common-emitter mode coupling terminal 10" to the relatively positive supply potential via the collector-emitter circuit of Q3. Thus, the circuit of FIG. 3 will simulate a single pole-double throw switch, controlled by potential pulses applied to the base electrode of transistor Q1.

The transistors chosen for use in the FIG. 2 and FIG. 3 circuits may, in general, be rated (with respect to power dissipation) for the drive requirements in the slow step mode. Typically such devices may be overdriven for short periods (as for short periods of operation in the fast step mode) without damage to the devices. Since the power requirements in the slow step mode are small the circuit can be realized with inexpensive elements. When the switch is realized with a FIG. 2 type arrangement, bipolar current drive is achieved with only two transistors. This is a further economy in terms of reduced numbers of parts relative to the typical four transistor bridge type bipolar drive circuit.

What is claimed is:

1. Circuitry for providing bipolar drive to a motor winding, said winding having first and second terminals, comprising:
   first and second supply terminals for applying relatively positive and relatively negative supply potentials respectively;
   switch means for alternately coupling said first winding terminal to said first and second supply terminals;
   first and second resistive means respectively connected between the first and second supply terminals and the second winding terminal; and
   a capacitor connected between the second winding terminal and a point of fixed potential.

2. The circuitry set forth in claim 1 wherein said switch means is a single-pole double throw switch having its pole connected to the first winding terminal and having first and second contacts respectively connected to said first and second supply terminals.

3. The circuitry set forth in claim 2 wherein said single pole-double throw switch is realized with circuitry including first and second transistors having respective principal conduction paths respectively coupled between the first and second supply terminals and the first winding terminal and conditioned to alternately conduct.

* * * * *